Jan. 18, 1972  H. WURM ET AL  3,636,189
METHOD FOR PRODUCING A PUNCH PRESS GUIDE
Filed April 25, 1969

*INVENTORS.*
HELMUT WURM &
KURT WURM

BY *Kurt Hellman*
AGENT 3,636,189
METHOD FOR PRODUCING A PUNCH
PRESS GUIDE
Helmut Wurm, Mariahallstr. 15, Sprendlingen, Hesse,
Germany, and Kurt Wurm, 42 Herrnrotherstr., 6079
Sprendlingen, Hesse, Germany
Filed Apr. 25, 1969, Ser. No. 819,388
Claims priority, application Germany, Apr. 26, 1968,
P 17 78 405.3
Int. Cl. B29c 1/02
U.S. Cl. 264—219         5 Claims

ABSTRACT OF THE DISCLOSURE

An accurately centered guide for a punch is produced by placing a pliable transparent sheet over the die, moving the punch through an oversized guide bore into contact with the sheet, accurately centering the punch in the bore with the aid of pressure marks stamped into the surfaces of the sheet by the punch, and casting a hardenable resin into the bore around the punch to provide a guide lining for the punch in the bore.

BACKGROUND AND SUMMARY OF THE INVENTION

The present invention relates to improvements in accurately guiding a male die in respect of a female die when the one is moved in relation to the other, such as the punch and die in a punch press.

While various means of forming accurately centered punch guides have been proposed, it is the primary object of this invention to provide a method and means for simply and dependably forming accurate punch guides without the use of complex tools and procedures.

This and other objects are accomplished in accordance with the invention by placing a pliable, preferably transparent sheet over the female die and moving the male die or punch through an oversized, rough guide bore into contact with the pliable sheet. The male die, which is preferably mounted on the die holder by magnetic force and may be readily laterally moved for centering, is then accurately centered in the guide bore in respect of the female die with the aid of marks stamped into the sheet surfaces by the male die. A hardenable material, such as an epoxy resin, is then cast into the bore around the accurately centered male die to provide an accurately centered lining in the bore to guide the male die during its relative movement in relation to the female die upon hardening of the material. The male die is then moved through the sheet to punch out a blank.

In this manner, the contour of the male die tightly engages and conforms to the circumference of the punched out hole in the sheet, thus sealing the bottom of the annular space in the bore between the male die and the bore wall, and preventing the hardenable material from leaking from the bore during casting.

After the guide for the punch has been cast and hardened, the press is ready for operation, with the punch and die most accurately centered in relation to each other.

Use of a transparent sheet and fine control of the pressure marks stamped into the sheet surfaces by the punch makes it possible readily visually to observe the relative positions of the marks on the two sheet surfaces, the punch being laterally moved until it stamps centered or concentric pressure marks into the two surfaces. Micrometer control means is preferably used for the downward movement of the punch to make only surface marks in the sheet surfaces, of an impression depth preferably of the order of hundredths of millimeters.

The visual observation of the surface marks in the pliable sheet obviates the need for any complex measurements with precision measuring instruments heretofore used for such purposes.

In the apparatus of the present invention, the male die is mounted, preferably magnetically, on a holder which is reciprocable in a frame. The female die is mounted on a die bed connected to the frame below the male die. A stripper plate is held in fixed position in respect to the female die, with the pliable sheet being interposed between the female die and the stripper plate. The stripper plate defines the oversized guide bore for the male die. The annular, hardened material cast into the bore lines the same and centers the male die in respect of the female die.

Reciprocation of the die holder in the frame may be effected by mechanical, electrical or pressure fluid means, i.e. hydraulically or pneumatically, as is conventional.

DETAILED DESCRIPTION OF DRAWING

The above and other objects, advantages and features of the present invention will become better understood from the following detailed description of a new embodiment thereof, taken in conjunction with the accompanying drawing wherein FIG. 1 is a side view, partly in section, of an apparatus useful for carrying out this invention;

DETAILED DESCRIPTION

Figure 1:
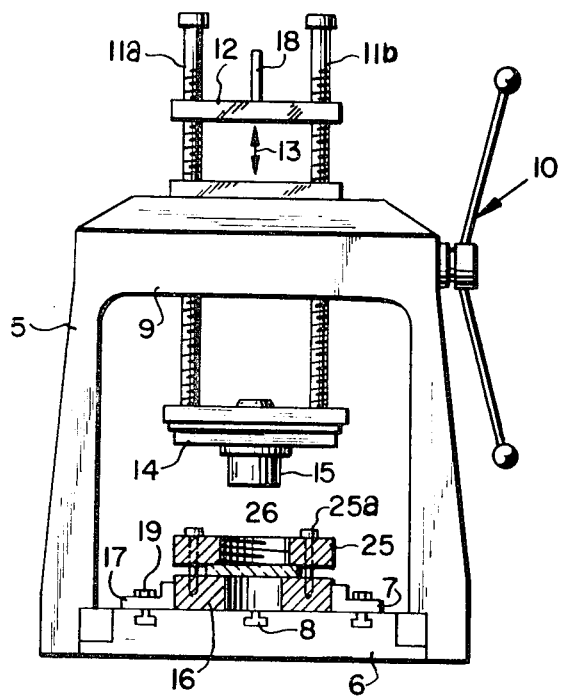

By way of example and for purposes of illustration, the invention has been illustrated and will be described in connection with a punch press. The press comprises a frame 5 whose two side posts are interconnected by a cross bar 9 and to whose lower ends is connected the die bed 6. The female die 16 is fixedly held on the die bed by means of clamps 17 which are bolted to the plane surface 7 of the die bed by bolts 19 engaging undercut bores 8 in the die bed.

The male die or blanking punch 15 is mounted in the frame for reciprocating movement indicated by arrow 13. The illustrated punch or die holder includes a pair of racks 11a, and 11b interconnected by cross brace 12 and journaled in cross bar 9, a gear train in this cross bar meshing with the racks and actuatable by handwheel 10 for moving the die holder up and down. A backing plate 14 interconnects the lower ends of the racks and holds the blanking punch 15. According to a preferred embodiment, plate 14 is a permanent magnet and the blanking punch comprises a permanent magnet plate for holding the punch on plate 14.

Figure 2:
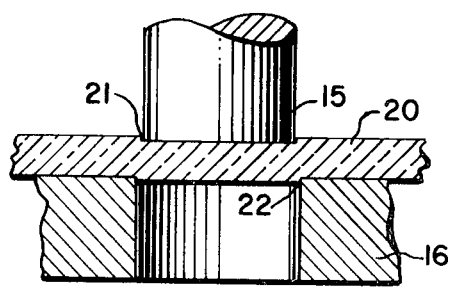
FIG. 2 is an enlarged sectional view of one part of the apparatus to illustrate the centering method of the invention.
Figure 3:
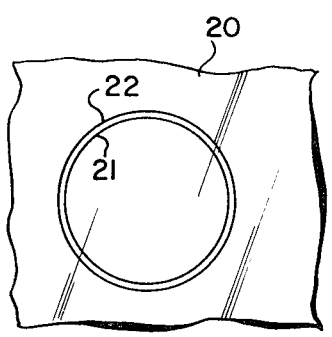
FIG. 3 is a top view of the pliable sheet showing the centering marks in the surfaces of the sheet stamped in the step shown in FIG. 2.
Figure 4:
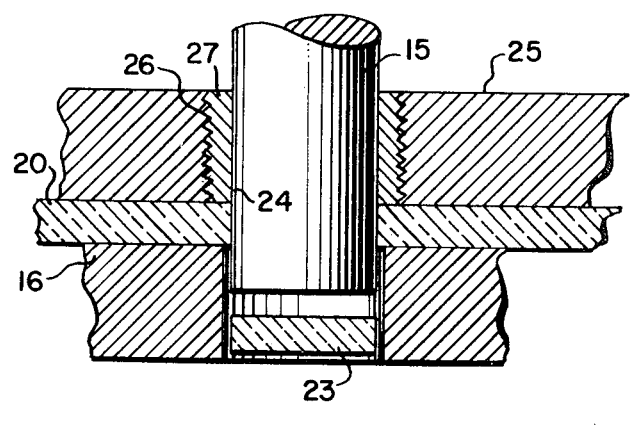
FIG. 4 is a view similar to that of FIG. 2 showing the final steps in the method.

The novel method of the present invention is best illustrated in FIGS. 2 to 4. A pliable sheet 20 is placed over the female die 16 between the die and stripper plate 25 which is held in fixed position in respect of the die 16 by screws 25a. The stripper plate defines a rough, oversized guide bore 26 for the male die 15 when the same is reciprocated into contact with the pliable sheet 20 and, subsequently, into the female die 16.

As shown in FIG. 2, the punch 15 is moved into contact with sheet 20 and then very slightly pressed downwardly until it stamps pressure marks 21 and 22 into respective surfaces of the sheet, the pressure mark 21 being determined by the contour of punch 21 and the pressure mark 22 being determined by the contour of die 16. A micrometer screw 18 is mounted on cross brace 12 of the punch holder to enable the reciprocating movement of the punch to be controlled very finely to a range of, say, 0.05 mm. In this manner, the pressure marks on the surfaces of the pliable sheet 20 are so controlled as to be just visible and without distorting the sheet. The sheet is preferably made of a transparent sheet material, such as cellophane or a suitable pliable synthetic resin film, so that, as seen in FIG. 3, the relative position of the marks in the two surfaces may be readily visually observed. If the two marks are not accurately centered in respect of each other, the punch 15 may be readily laterally moved on the plate 14, the punch being held on the plate by magnetic force only and, therefore, being glidable in respect thereof. The punch is moved laterally until the pressure marks 21 and 22 are centered in respect of each other, as indicated in FIG. 3. In this position, the punch 15 and die 16 are also accurately centered.

After accurate centering with the aid of the marks stamped into the pliable sheet 20 by the male die 15, the punch is moved down further, as shown in FIG. 4, to punch out blank 23 from sheet 20. The contour 24 of the punch is in close engagement with the punched-out hole in sheet 20. A hardenable material 27 is now cast into the bore 26 around the accurately centered male die 15 to provide an accurately centered guide for punch 15 during its relative movement in relation to female die 16 upon hardening of the material. The hardenable material may be any suitable castable synthetic resin, for instance, epoxy resins being preferred. After the resin has been permitted to harden, it will form an annular lining in bore 27 of exactly the same inner diameter as the diameter as the diameter of punch 15. During casting and while the hardenable material is still in flowable condition, the underlying sheet 20 will hold the material in the bore. Thus, an accurate punch guide is produced simply and without the need of complicated tools or additional work on the guide bore.

While the invention has been described and illustrated in connection with a preferred embodiment, many modifications and variations may occur to those skilled in the art after benefiting from the present teaching.

What is claimed is:
1. A method of producing a guide for a male die which is accurately centered in respect of a female die, the dies being movable in relation to each other, comprising the steps of

(1) placing a pliable sheet of synthetic material over the female die and supporting the pliable sheet thereon,
(2) moving the male die through a fixed oversized guide bore having an end adjacent the pliable sheet into stamping contact with the pliable sheet,
(3) accurately centering the male die in the guide bore in respect of the female die with the aid of marks stamped into the surfaces of the pliable sheet when the male die makes stamping contact with the sheet,
(4) holding the pliable sheet against the adjacent guide bore end by the female die to seal the guide bore end,
(5) casting a hardenable material into the bore around the accurately centered male die,
   (a) the pliable sheet sealing the bore against leakage of the material out of the bore end, and
(6) hardening the material in the bore to produce the accurately centered guide for the male die during movement in respect of the female die.

2. The method of claim 8, wherein the male die is moved into contact with the pliable sheet until pressure marks are stamped into respective surfaces of the sheet by the male die and the female die, and one of the dies is moved laterally in relation to the other die until the pressure marks in the two surfaces of the sheet are centered in respect of each other whereby the accurate centering of the dies is indicated.

3. The method of claim 2, wherein the pliable sheet is transparent whereby the centering of the pressure marks in the two surfaces may be visually observed.

4. The method of claim 8, wherein the hardenable material is an epoxy resin.

5. The method of claim 1, wherein the male die is moved through the pliable sheet to punch out a blank and the hardenable material is cast into the guide bore after the male die has punched out the blank.

References Cited
UNITED STATES PATENTS 2,186,799   1/1940   Boker _____ 76—107
3,400,655   9/1968   Leskinen _____ 76—107

ROBERT F. WHITE, Primary Examiner

J. H. SILBAUGH, Assistant Examiner

U.S. Cl. X.R.

76—107 R; 264—242, 269